United States Patent [19]

Masumoto et al.

[11] Patent Number: 4,809,647
[45] Date of Patent: Mar. 7, 1989

[54] INTAKE SYSTEM FOR MULTI CYLINDERED ENGINE

[75] Inventors: Iwao Masumoto, Shimada; Osamu Takii, Hamamatsu, both of Japan

[73] Assignee: Yamaha Hatsudoki Kabushiki Kaisha, Iwata, Japan

[21] Appl. No.: 2,730

[22] Filed: Jan. 13, 1987

[30] Foreign Application Priority Data

Jan. 14, 1986 [JP] Japan .................................. 61-4348

[51] Int. Cl.⁴ ............................................ F02B 75/18
[52] U.S. Cl. ................................ 123/52 MB; 123/302
[58] Field of Search ......... 123/52 M, 52 MB, 52 MV, 123/302, 308, 432

[56] References Cited

U.S. PATENT DOCUMENTS 4,622,926 11/1986 Rutschmann et al. ......... 123/52 MB
4,649,876 3/1987 Ohmi et al. .......................... 123/302

FOREIGN PATENT DOCUMENTS 2168752 6/1986 United Kingdom ........ 123/52 MB

Primary Examiner—David A. Okonsky
Attorney, Agent, or Firm—Ernest A. Beutler

[57] ABSTRACT

An improved induction system for a V type engine that is tuned for substantially all running conditions and which is nevertheless compact in construction. The system includes a pair of plenum chambers each disposed adjacent one of the cylinder heads of the engine. Each cylinder head has at least two intake passages serving the respective cylinder bores and a first conduit extends from the adjacent plenum chamber to one of the intake passages and a second conduit extends from the other of the plenum chambers to the other intake passage. A throttle valve arrangement is also incorporated so that good performance is achieved under all running conditions. The plenum chambers communicate with each other as their opposite ends to improve airflow and a common inlet opening serves each plenum chamber inlet.

26 Claims, 4 Drawing Sheets

INTAKE SYSTEM FOR MULTI CYLINDERED ENGINE

BACKGROUND OF THE INVENTION

This invention relates to an intake system for a multi cylindered engine and more particularly to an improved induction system for an engine that includes a pair of plenum chambers and an improved arrangement for introducing atmospheric air to the plenum chambers.

In the induction system for an internal combustion engine it has been found that certain advantages can be achieved by employing a plenum chamber in the engine induction system. Such plenum chambers have the advantage of damping pulsations in the intake flow to the chambers of the engine and also facilitate tuning. With certain engines, there is a further advantage in employing a plurality of plenum chambers for the engine. For example, if the engine is provided with cylinders arranged in banks, either V type or opposed engines, there may be certain advantages in providing a separate plenum chamber for each cylinder bank of the engine. However, where plural plenum chambers are provided there is an advantage in incorporating a single intake for all of the plenum chambers. The use of such a single intake, permits a single air filter element, single air silencer and single flow controlling throttle valve. As a result, certain simplicities and cost reduction may be achieved. An example of an engine embodying such an induction system may be found in co-pending application Ser. No. 634,795, filed July 26, 1984 and now U.S. Pat. No. 4,649,876 in the name of Masatoshi Omi et al, entitled "Intake Means of Internal Combustion Engine" and assigned to the assignee of this application.

Although the system disclosed in the aforenoted co-pending application has been found to provided a number of advantages, it has recently been discovered that still further improvements in engine performance maybe achieved in connection with this type of induction system, That is, where the plenum chambers each have their inlets at one end of the chamber, it is found that there may be some restriction to the intake of the individual cylinders under certain running conditions. For example, under some running conditions the direction of air flow through the plenum chamber to an individual cylinder must reverse. That is, the middle cylinder of the plenum chamber may draw intake air from either end of the chamber under certain running conditions. As a result, there may occur reversals in air flow in the plenum chambers which can reduce volumetric efficiency. Further more, the use of the single air inlet for each plenum chamber may, itself, reduce the breathing capacity of the engine.

It is, therefore, a principle object of this invention to provide an improved induction system for an internal combustion engine.

It is a further object of this invention to provide an induction system for an internal combustion engine in which plural plenum chambers are employed and in which the performance may be improved even though the system is provided with a single air intake.

It is a further object of this invention to provide an improved induction system for an internal combustion engine embodying plural plenum chambers.

In the induction system disclosed in the forenoted co-pending application Ser. No. 634,795 each cylinder of the engine is provided with a pair of intake passages. One of these intake passages is served by the plenum chamber that is adjacent that cylinder bank while the other intake passage is served by the plenum chamber adjacent the opposite cylinder bank. In this way, the intake passages may be tuned to have different lengths and an improvement in performance throughout the entire engine load and speed ranges may be obtained. However, the disadvantages as aforenoted may be present in this type of induction system.

It is, therefore, a further object of this invention to provide an improved induction system for an engine having plural intake passages for each chamber of the engine.

It is a further object of this invention to provide an improved induction system for a multiple valve internal combustion engine.

SUMMARY OF THE INVENTION

A first feature of this invention is adapted to be embodied in an induction system for an internal combustion engine having a combustion chamber. First and second plenum chambers are incorporated and means are provided for deliving a charge from each of the plenum chambers to the combustion chamber. In accordance with this feature of the invention, a pair of spaced atmospheric air inlets are provided for each plenum chamber.

Another feature of the invention is adapted to be embodied in an induction system for an internal combustion engine having at least two cylinder banks. First and second plenum chambers are provided and means are incorporated for delivering a charge from the first plenum chamber to the first cylinder bank and from the second plenum chamber to the second cylinder bank. In accordance with this feature of the invention, each of the plenum chambers is provided with a pair of spaced atmospheric air inlets.

DETAILED DESCRIPTION OF THE PREFERRED EMBODIMENT

Figure 1:
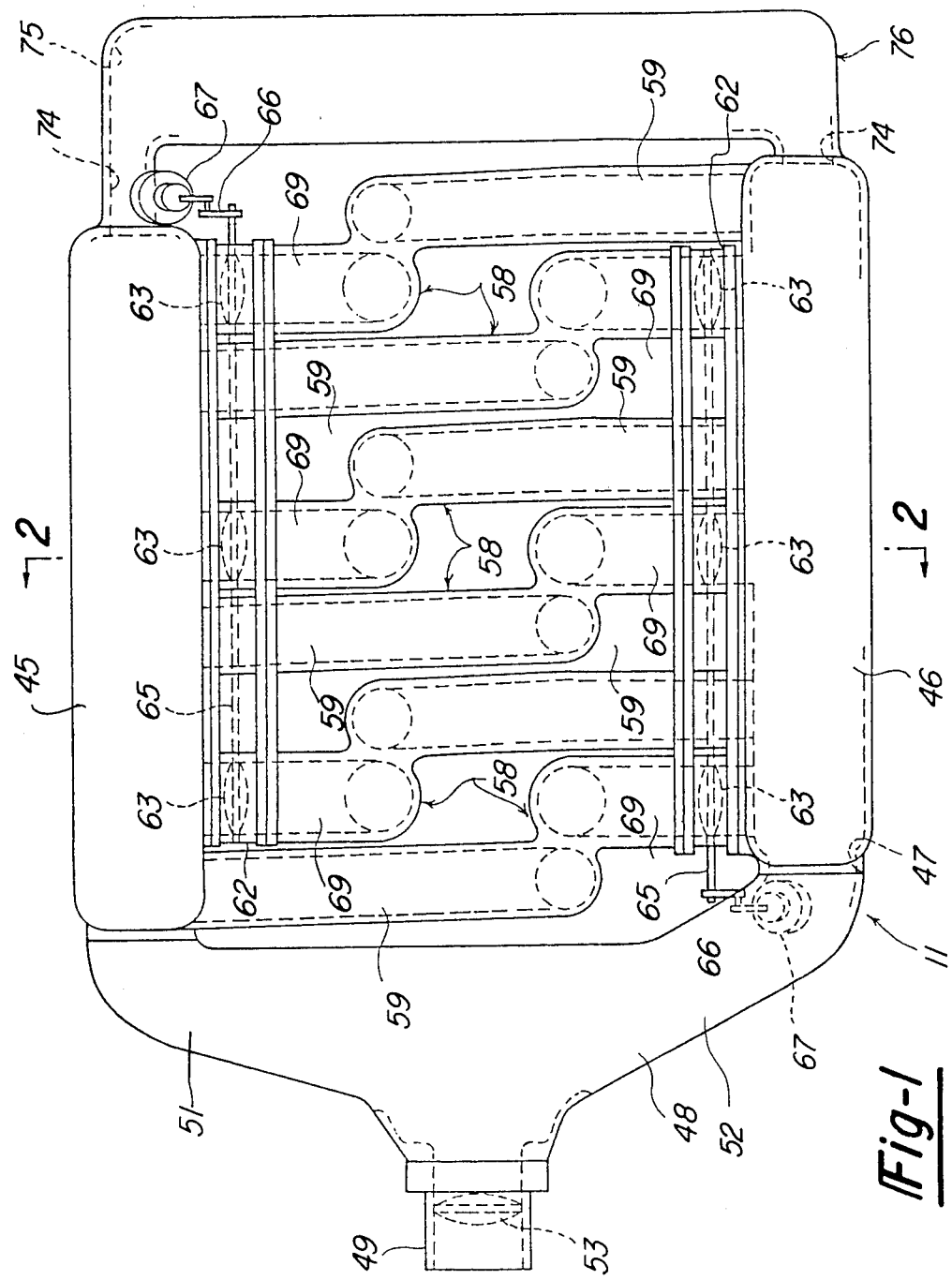
FIG. 1 is a top plan view of an internal combustion engine constructed in accordance with an embodiment of the invention.

In the drawings, the reference numeral 11 indicates generally an internal combustion engine constructed in accordance with an embodiment of the invention. In the illustrated embodiment, the engine 11 is of the "V" type and includes a cylinder block 12 having angularly inclined banks 13 and 14. In the illustrated embodiment, the engine 11 is of the V6 type and each cylinder bank 13 and 14 defines three cylinder bores, as will be described. The cylinder bores of the bank 13 are disposed at an angle to those of the bank 14 and in the illustrated embodiment, this angle is 60°. It is to be understood, however, that the invention and certain facets of it are useful with engine of other configurations and engines in which the angle between the banks is other than 60°. The invention, however, has particular utility in conjunction with V type engines and particularly those in which a very narrow or relatively shallow cylinder bank angle is employed.

Figure 2:
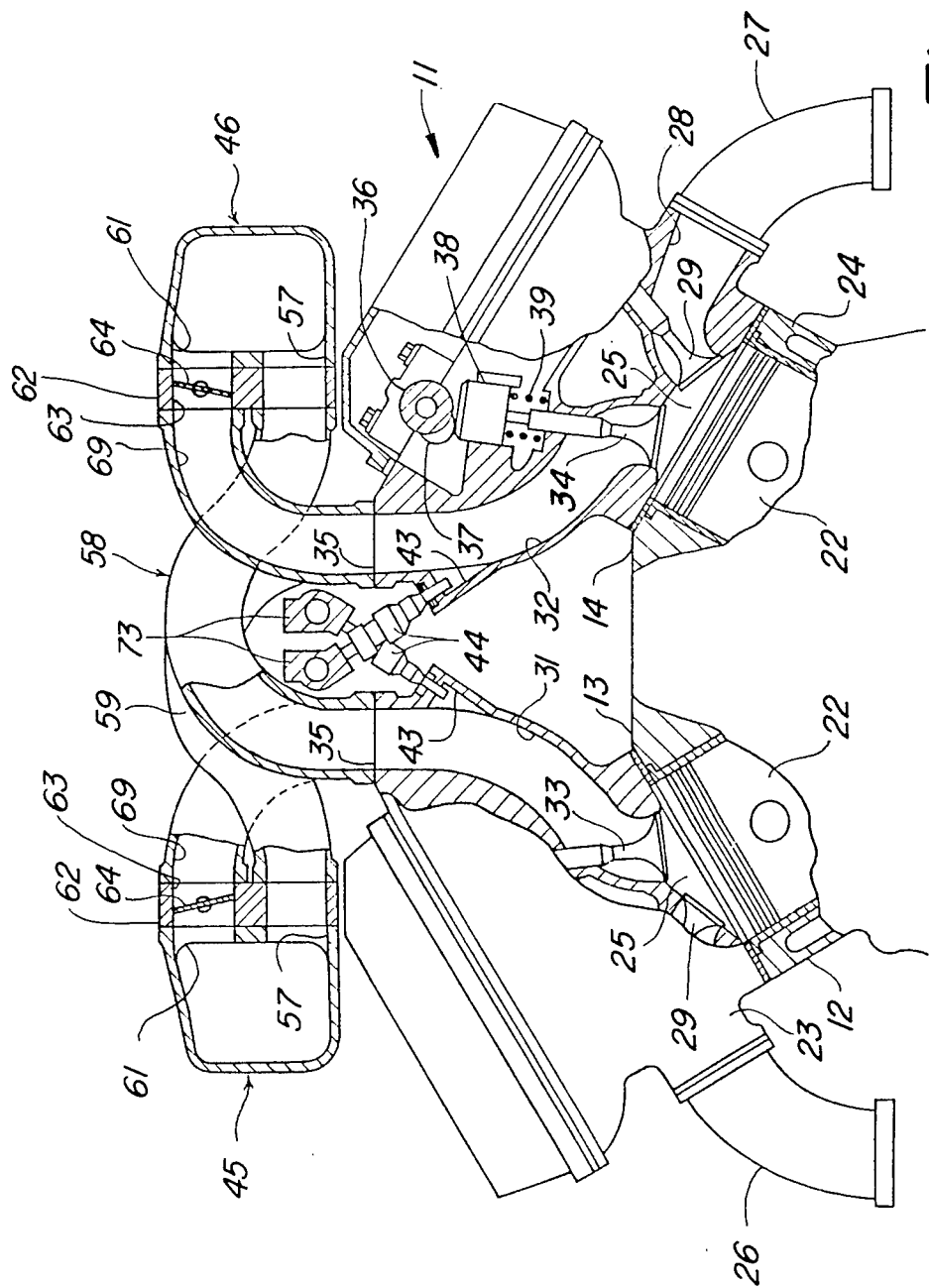
FIG. 2 is a cross-sectional view taken along the line 2—2 of FIG. 1.
Figure 4:
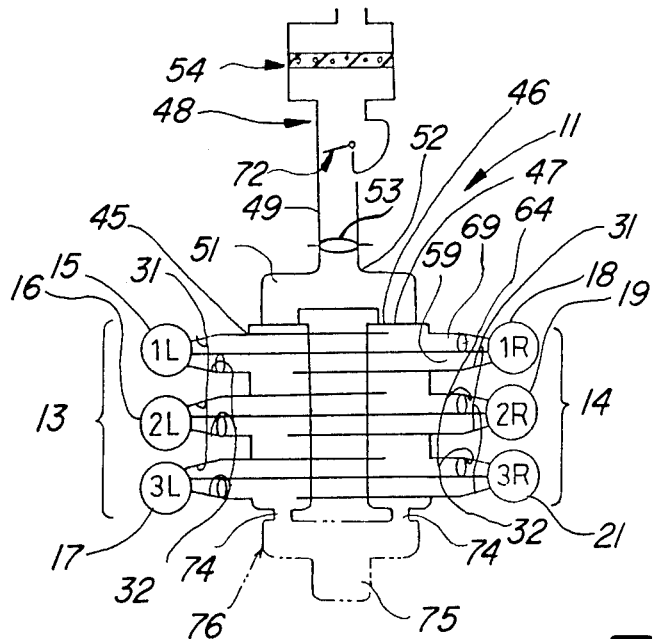
FIG. 4 is a partially schematic view showing the induction system.

The cylinder bank 13 is provided wtih three cylinder bores, as has been noted, which cylinder bores are shown as circles in FIG. 4 and are identified by the respective numerals 15, 16, and 17. In a like manner, the cylinder bank 14 is also formed with three cylinder bores which are shown in circles and which are identified by the reference numerals 18, 19 and 21. Pistons 22 (FIG. 2) are reciprocally supported in each of the cylinder bores 15 through 19 and 21 and are connected to a crankshaft (not shown) in a known manner as by means including connecting rods.

A cylinder head, indicated generally by the reference numeral 23, is affixed in a known manner to the cylinder bank 13. In a like manner, a cylinder head, indicated generally by the reference numeral 24, is affixed to the cylinder bank 14. Each cylinder head 23 and 24 has a recessed cavity 25 formed therein for each of the cylinder bores. The cavities 25, pistons 22 and cylinder bores 15 through 19 and 21 form the combustion chambers of the engine and the reference numerals 25 will be, at times, referred to as the combustion chambers.

The combustion chambers 25 are generally hemispherical in shape and each chamber is provided with a pair of exhaust passages formed in the respective cylinder head 23 or 24 which extend from the chambers 25 and which are adapted to cooperate with respective exhaust manifolds 26 and 27. These exhaust passages are identified by the reference numeral 28 and are shown only in FIGS. 2 and 3. Exhaust valves 29 are reciprocally supported in each of the cylinder heads 23 and 24 and control the communication of the cylinder head exhaust passages 28 with the combustion chambers 25. The exhaust valves 29 associated with each cylinder bore 15 through 19 and 21 are operated in unison in a suitable manner as by means of an overhead mounted camshaft (not shown).

On the opposite sides of the hemisphere from the exhaust valves 29, the cylinder heads 23 and 24 are provided with a pair of intake passages 31 and 32 for each chamber 25. The passages 31 terminate at an intake valve 33 while the passages 32 terminate at an intake valve 34. The portion of the passages 31 and 32 which extend through the respective cylinder heads 23 and 24 are substantially identical in construction and they each terminate in a generally horizontally extending surface 35 of the respective cylinder head.

The intake valves 33 and 34 are, like the exhaust valves 29, operated by means of respective overhead mounted camshafts 36, each supported for rotation in the respective cylinder head 23 or 24 in a known manner. The intake camshafts 36 have lobes 37 that cooperate with thimble tappets 38 so as to operate the valves 33 and 34 in a known manner. Coil compression springs 39 are provided for urging the valves 33 and 34 toward their closed positions.

Figure 3:
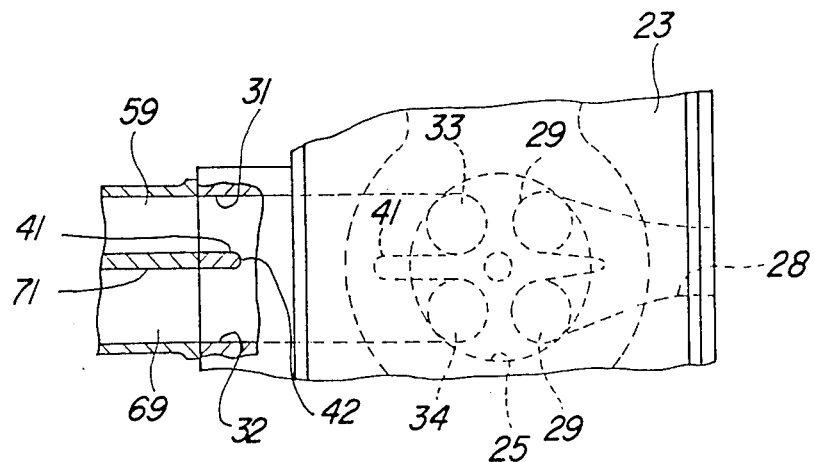
FIG. 3 is an enlarged top elevational view, with a portion broken away, showing the construction associated with a single cylinder of the engine.

As may be readily seen from FIG. 3, the cylinder head intake passages 31 and 32 are separated from each other by a boundary wall 41 that extends from the valve seats and for a portion of the length of the passages 31 and 32. However, this wall terminates short of the cylinder head face 35 so as to provide an open area 42 of limited length through which the passages 31 and 32 may communicate with each other, for a reason to be disclosed. In this communicating area 42, each cylinder head is provided with a recess 43 (FIG. 2) into which a fuel injection nozzle 44 extends. The nozzles 44 discharge in the downstream direction and because of their central placement, there will be good fuel distribution balance between the intake passages 31 and 32.

The induction system for the engine 11 further includes a first plenum chamber 45 that is juxtaposed to and positioned above the cylinder head 23 of the cylinder bank 13. A second, generally similar plenum chamber 46 is disposed adjacent and immediately above the cylinder head 24 of the cylinder bank 14. The plenum chambers 45 and 46 have inlet openings 47 at their forward ends which receive atmospheric air from an intake device, indicated generally by the reference numeral 48 and which has a generally Y shape in top plan. The intake device 48 has a common throat portion 49 from which branches 51 and 52 extend to the respective air boxes 45 and 46. A manually operated throttle valve 53 is supported in the throat 49 and is connected by a suitable linkage to the operator control for controlling the air flow into the induction system. A suitable air cleaner 54 (FIG. 9) is positioned upstream of the throat device 49 for filtering the intake air and for achieving such silencing as may be desired.

The lower portion of each plenum chamber 45 and 46 is provided with respective outlet openings 57, there being one such opening 57 for each cylinder of one bank of the engine. The openings 57 communicate with elongated conduits 58 which have internal passages 59 and which extend from each opening 57 to an induction passage 31 of the opposing cylinder bank. That is, the plenum chamber 45 serves the intake passages 31 of the cylinder head 24 while the plenum chamber 46 serves the intake passages 31 of the cylinder head 23. As a result, a relatively long air flow path is provided which gives the opportunity to insure laminar flow through the induction system so that the passages consisting of the plenum chambers 45 or 46, passages 59 and cylinder head intake passages 31 may be turned so as to give good running characteristics at low and mid-range running.

Each plenum chamber 55 is also provided with a plurality of outlet openings 61, there being one such opening for each cylinder of one bank of the engine. The openings 61 communicate with respective valve bodies, indicated generally by the reference numberal 62, which are affixed in a suitable manner to the plenum chambers 45 and 46. The valve bodies 62 have a number of passages 63 that are equal in number to the openings 61 and which directly communicate with these openings. Throttle valves of the butterfly type 64 are supported in each of the valve body openings 63 on a common throttle valve shaft 65. In this way, the throttle valves 64 associated with plenum chambers 45 and 46 will be operated in unison.

At one end of the engine 11, the throttle valve shaft 65 associated with the plenum chamber is extended and is connected by means of a linkage system 66 to a vacuum motor 67. The vacuum motor senses induction system vacuum downstream of the throttle valve 64. The construction and operation of the vacuum motor 67 is such that the throttle valves 65 will be held in their closed position until induction system pressure increases (manifold vacuum decreases) so as to indicate that the engine has approached its maximum power output or power demand condition. Then the valves 64 will be opened.

The throttle valve shaft 65 of the valve body 62 associated with the plenum chamber 46 extends from the other end of the engine and is also connected to a vacuum actuator 67 by means of a linkage system 66 so as to be operated in the same manner as that associated with the plenum chamber.

The valve body induction passages 63 communicate with induction passages 69 that each extend to the intake passages 32 of the adjacent cylinder head. Hence, the plenum chamber 45 serves the intake passages 32 of the cylinder head 23 while the plenum chamber 46 serves the intake passages 32 of the cylinder head 24. Hence, these intake passages can be kept very short to permit tuning for maximum power output.

It should be noted that the conduit passages 59 and 69 serving the intake passages 32 and 31, respectively, are separated from each other by respective walls 71. Hence, there is only a relatively short area of open communication (the area 42) between the respective conduits serving the cylinder head intake passages 31 and 32. This short but nevertheless open communication has been found to be extremely important in assuring good running during transition from mid-range to wide open performance.

In addition to having a common throttle valve 53 that controls the flow of intake air to the plenum chambers 45 and 46, the intake device 48 is also provided with a single flow sensor 72, which may be of vane type, and which senses the air flow into the induction system. This sensor 72 is connected through a suitable control system for controlling the amount of flow delivered to the injection nozzles 44 through a pair of fuel manifold 73 that are disposed in proximity to the cylinder heads 23 and 24 and injection nozzles 44. The specific construction for controlling the fuel flow may be of any known type.

The operation of the induction system will now be described. During low speed running, the manually operated common throttle valve 53 will be operated under the operator's control and will be opened only to a small degree. There will be a relatively high induction system vacuum exerted on the vacuum motors 67 so as to hold the throttle valves 64 in their closed positions. Hence, substantially all of the induction air for the engine will be supplied through the inlet device 48 to the plenum chambers 45 and 46 and specifically to their outlets 57. This air is transferred from the plenum chamber 45 through the relatively long conduits 58 and passages 59 to the induction passages 31 of the cylinder head 24. In a like manner, the plenum chamber 46 will serve the induction passages 31 of the cylinder head 23. Hence, as has already been noted, a relatively long air path is provided that will insure laminar flow. However, the air flow will flow through a relatively small cross-sectional area of the total induction system area serving each cylinder bore 15 through 19 and 21 so that the induction will be at a high velocity. This will insure a rapid rate of flame propagation in the chambers which insures that there will be good combustion.

As the load on the engine increases and the manually operated throttle valve 53 is progressively opened, there will be a good point when the passages 31 cannot supply the full charge requirements of the combustion chambers 25. This occurs at a point before that at which the throttle valves 64 are opened. At this point, induction charge may flow through the communicating area 42 to enter the chambers 25 through both the induction passages 31 and 32 and intake valves 33 and 34 of the cylinder head. As has been previously noted, this communication provides significantly improved mid-range performance since it eliminates or substantially reduces the dip which would otherwise occur in the torque curve of the engine at this point.

As the load continues to increase, and the throttle valve 53 is progressively opened, the induction system vacuum will eventually reach a point where the vacuum motors 67 no longer hold the control valves 64 in their closed position and these valves will open. Thus, the effective area of the induction system serving each cylinder bore 15 through 19 and 21 will substantially increase and a very good maximum output can be achieved. Furthermore, as has been noted, the passages 69 which serve the intake ports 32 are relatively short and will offer low flow resistance and may be tuned so as to achieve the desired flow under this running condition.

Figure 5:
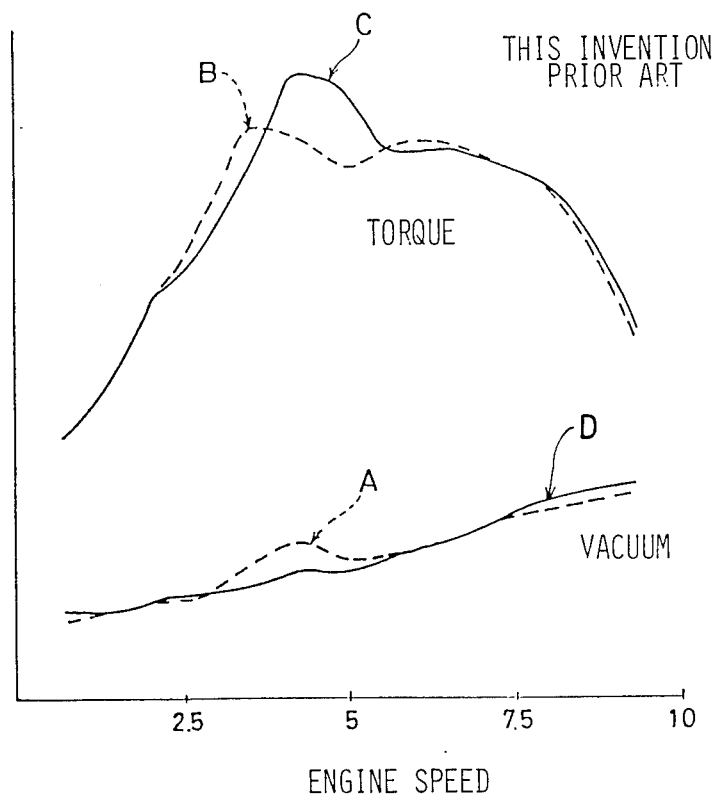
FIG. 5 is a graphical view showing the torque characteristics and vacuum in the plenum chamber in accordance with the invention and in accordance with the prior art.

The construction as thus far described may be considered to be substantially the same as that described in co-pending application Ser. No. 634,795. In accordance with this type of construction, even though the overall performance has been found to be improved significantly from conventional prior art engines, it is believed there can be further improvement. The reason for this may be understood by reference to FIG. 5 wherein the torque curve of the prior art type of engine as disclosed in Ser. No. 634,795 is indicated by the curve B. It should be noted that at mid-range performance there is somewhat of a dip in the torque curve. Although the torque curve is generally flat at this point, it is desirable to improve the torque under mid-range performance, since this is the normal cruising speed of the engine.

It has been found that the torque can be improved by improving the breathing capacity of the individual plenum chambers 45 and 46 as shown by the curve A. The vacuum existing in the plenum chambers 45 and 46 has been found to increase under mid-range running. This is believed to exist due to restrictions in the air flow into the plenum chambers 45 and 46 and also because of reverse flow which has been found to occur in the plenum chambers under this condition. That is, there is some interference between the flow to the individual cylinders served by the plenum chamber passages 57 under this running condition. In accordance with this invention, an arrangement is provided for incorporating an additional air intake into each of the plenum chambers 45 and 46 which has been found to significantly improve performance under this running condition without adversely effecting the running under other conditions.

In accordance with this feature of the invention, a pair of rearward air inlet openings 74 are provided with one such opening being formed at each rear end of the plenum chambers 45 and 46. The openings 74 provide an additional source of air flow which reduces the restrictions of air flow into the plenum chambers 45 and 46 and, furthermore, reduces the reverse flow which may be incorporated with the plenum chambers. An interconnecting passageway 75 is formed within a connecting manifold 76 that is bolted to the rear end of the plenum chambers 45 and 46, so that the plenum chambers 45 and 46 may freely communicate with each other at the end opposite the foreward inlet openings 47. Because of the firing order of the engine, the connecting passageway 75 permits the plenum chambers 45 and 46 to serve each other when each one of them is serving an individual cylinder and hence there can be good air flow into each air chamber 45 and 46. In addition, because of this interconnection, all of these separate atmospheric inlets provided by the openings 47 and 74 are served by the same throttle valve 53 and air cleaner 54 so as to simplify the overall construction.

Referring again to FIG. 5, it will be seen that the torque curve C for the engine embodying the interconnecting passageway 75 ad rearward inlet opening 74 does not have a dip but rather has an increase at midrange performance. As may be seen from the vacuum curve D, this results from the reduction of the vacuum in the individual plenum chambers 45 and 46 during this running condition. Therefore, very good performance is possible throughout the entire engine load and speed ranges while at the same time maintaining a very simple overall construction in that only one air cleaner, one main throttle valve and one air flow sensor is required.

A specific embodiment of the invention has been applied to a 3 liter engine having a firing order of 3L, 3R, 2L, 2R, 1L, 1R. In this engine the volume of each of the plenum chambers 45 and 46 was 2 liters (⅔ of engine displacement), the volume of the interconnecting manifold was 0.68 liters and that of the intake device 48 downstream of the throttle valve 53 was 0.51 liters. These relations were found to give optimum performance.

Although an embodiment of the invention has been illustrated and described, various changes and modifications may be made without departing from the spirit and scope of the invention, as defined by the appended claims.

We claim:

1. In an induction system for an internal combustion engine having a combustion chamber, a first plenum chamber, a second plenum chamber, means for delivering a charge from said first plenum chamber directly to said combustion chamber, and means for delivering a charge from said second plenum chamber directly to said combustion chamber, the improvement comprising a pair of spaced air inlets for each of said plenum chambers, a common atmospheric air inlet for all of said plenum chamber air inlets and a single throttle valve in said common air inlet for providing the sole control for the flow through all of said plenum chamber air inlets.

2. An induction system as set forth in claim 1 further including filter means for filtering the air delivered to the plenum chambers.

3. An induction system as set forth in claim 2 wherein the filter means comprises a single filter positioned in registry with the common atmospheric air inlet that serves each of the plenum chamber air inlets.

4. An induction system as set forth in claim 1 wherein the atmospheric inlets for each of the plenum chambers are disposed at opposite ends of the plenum chambers and on opposite sides of the means for delivering the charge from the plenum chambers to the combustion chamber.

5. An induction system as set forth in claim 1 wherein the plenum chamber air inlets comprise a first pair of air inlets at one end of the plenum chambers communicating directly with each other and directly with the common atmospheric air inlet and a second pair of inlets at the other end of said plenum chambers and communicating directly with each other.

6. In an induction system for an internal combustion engine having at least two cylinder banks, a first plenum chamber, a second plenum chamber, means for delivering a charge from said first plenum chamber to said first cylinder bank for induction thereto, and means for delivering a charge from said second plenum chamber to said second cylinder bank for induction thereto, the improvement comprising a pair of spaced air inlets for each of said plenum chambers at opposite ends thereof, a common atmospheric air inlet for all of said plenum chamber air inlets and a single throttle valve in said common air inlet for providing the sole control for the flow of air through said plenum chamber air inlets.

7. An induction system as set forth in claim 6 further including filter means for filtering the air delivered to the plenum chambers.

8. An induction system as set forth in claim 7 wherein the filter means comprises a single filter positioned in registry with the common atmospheric air inlet.

9. An induction system as set forth in claim 6 wherein each of said cylinder banks comprises a plurality of cylinders, the means for delivering a charge from the plenum chambers to the cylinder banks comprising spaced outlet openings formed along the length of the respective plenum chambers.

10. An induction system as set forth in claim 9 further including filter means for filtering the air delivered to the plenum chambers.

11. An induction system as set forth in claim 10 wherein the filter means comprises a single filter positioned in registry with the common atmospheric air inlet.

12. An induction system as set forth in claim 6 wherein first conduit means extend directly from each of said plenum chambers to intake passage means of one cylinder bank, and second conduit means extend directly from each of said plenum chambers to intake passage means of the other of said cylinder banks.

13. An induction system as set forth in claim 12 wherein the first conduit means has a different effective length than the second conduit means.

14. An induction system as set forth in claim 12 wherein the first and second conduit means each comprise a means defining a plurality of passages extending from the respective plenum chambers to the respective cylinder bank.

15. An induction system as set forth in claim 14 wherein the passages of the first conduit means are of a substantially different length than the passages of the second conduit means.

16. An induction system as set forth in claim 15 wherein the intake passage means are formed in a cylinder head and comprise a plurality of intake passages each serving the same cylinder bore of the cylinder bank.

17. An induction system as set forth in claim 14 wherein the intake passage means are formed in a cylinder head and comprise a plurality of intake passages each serving the same cylinder bore of the cylinder bank.

18. An induction system as set forth in claim 17 further including throttle valve means for controlling the flow through the passages of only the first conduit means.

19. An induction system as set forth in claim 18 wherein the throttle valve means is operative in response to the load on the engine.

20. An induction system as set forth in claim 6 wherein the cylinder banks are disposed at a V angle to each other and the plenum chambers lie above respective cylinder heads closing the respective banks.

21. An induction system as set forth in claim 20 wherein the first conduit means has a different effective length than the second conduit means.

22. An induction system as set forth in claim 20 wherein the first and second conduit means each comprise a means defining a plurality of passages extending from the respective plenum chambers to the respective cylinder bank.

23. An induction system as set forth in claim 22 wherein the passages of the first conduit means are of a substantially different length than the passages of the second conduit means.

24. An induction system as set forth in claim 23 wherein the intake passage means of the cylinder head comprise a plurality of intake passages each serving the same cylinder bore of the cylinder bank.

25. An induction system as set forth in claim 22 wherein the intake passage means of the cylinder head comprise a plurality of intake passages each serving the same cylinder bore of the cylinder bank.

26. An induction system as set forth in claim 25 further including throttle valve means for controlling the flow through the passages of only the first conduit means.

* * * * *